(12) United States Patent
Pestana et al.

(10) Patent No.: US 10,867,006 B2
(45) Date of Patent: *Dec. 15, 2020

(54) TAG PLAN GENERATION

(71) Applicant: OBSERVEPOINT, INC., Provo, UT (US)

(72) Inventors: John Raymond Pestana, Provo, UT (US); Robert K. Seolas, Alpine, UT (US); Tyler Broadbent, Lehi, UT (US); Dan Reno, Orem, UT (US); Gregory Larson, Orem, UT (US)

(73) Assignee: OBSERVEPOINT, INC., Pleasant Grove, UT (US)

( * ) Notice: Subject to any disclaimer, the term of this patent is extended or adjusted under 35 U.S.C. 154(b) by 292 days.

This patent is subject to a terminal disclaimer.

(21) Appl. No.: 15/966,822

(22) Filed: Apr. 30, 2018

(65) Prior Publication Data
US 2019/0065512 A1 Feb. 28, 2019

Related U.S. Application Data

(63) Continuation-in-part of application No. 15/682,839, filed on Aug. 22, 2017, now Pat. No. 10,754,915.

(51) Int. Cl.
*G06F 16/00* (2019.01)
*G06F 16/958* (2019.01)
*G06Q 30/02* (2012.01)

(52) U.S. Cl.
CPC ....... *G06F 16/958* (2019.01); *G06Q 30/0201* (2013.01); *G06Q 30/0277* (2013.01)

(58) Field of Classification Search
CPC .............. G06F 16/958; G06F 17/3089; G06F 16/9577; G06Q 30/0277; H04L 41/08
See application file for complete search history.

(56) References Cited

U.S. PATENT DOCUMENTS 6,470,383 B1  10/2002  Leshem et al.
9,553,918 B1 *  1/2017  Manion .................. G06F 16/00
(Continued)

OTHER PUBLICATIONS

Office Action dated Dec. 31, 2019 from U.S. Appl. No. 15/682,839, filed Aug. 22, 2017.

*Primary Examiner* — Merilyn P Nguyen
(74) *Attorney, Agent, or Firm* — Workman Nydegger; W. Brad Barger

(57) ABSTRACT

A computer system for managing a configuration of network-based analytic elements accesses one or more webpages. Each of the webpages is represented at least in part by webpage source code. The computer parses the webpage source code associated with the webpages. The computer system identifies within the webpage source code a plurality of network-based analytic elements executable within a network-connected software application, and one or more webpage source code attributes that comprise information relating to the rendering of the webpage source code. Based on the dataset of information, the computer system defines a first rule configured to associate at least one network-based analytic element with a webpage source code attribute. Additionally, the computer system stores the first rule within a digital database, the digital database comprising a set of rules configured to describe attributes of the plurality of network-based analytic elements.

20 Claims, 6 Drawing Sheets

(56) References Cited

U.S. PATENT DOCUMENTS

| | | | |
|---|---|---|---|
| 10,360,133 B2* | 7/2019 | Pestana | H04L 41/08 |
| 2011/0225115 A1* | 9/2011 | Moitra | G06F 3/0482 |
| | | | 706/50 |
| 2013/0179770 A1* | 7/2013 | Kent | G06F 16/954 |
| | | | 715/234 |
| 2013/0276136 A1* | 10/2013 | Goodwin | G06Q 30/02 |
| | | | 726/27 |
| 2016/0048602 A1 | 2/2016 | Yastrebenetsky et al. | |
| 2017/0230258 A1* | 8/2017 | Pestana | H04L 43/062 |
| 2017/0249130 A1* | 8/2017 | Smiljanic | G06F 8/43 |
| 2018/0019913 A1* | 1/2018 | Sharma | H04L 41/0823 |
| 2018/0025157 A1* | 1/2018 | Titonis | H04W 12/1208 |
| | | | 726/24 |

* cited by examiner

TAG PLAN GENERATION

CROSS-REFERENCE TO RELATED APPLICATIONS

This application is a continuation-in-part of U.S. Non-Provisional application Ser. No. 15/682,839 entitled "TAG PLAN GENERATION", filed on Aug. 22, 2017, the entire contents of which is incorporated by reference herein in its entirety.

BACKGROUND OF THE INVENTION

1. Technical Field

Implementations of the present invention relate to network communication analysis and management.

2. Background and Relevant Art

As the Internet and the accompanying Internet commerce have expanded, various website owners have sought to track a variety of data about individuals who visit their websites and/or use their applications. In many cases, this analytic data can be used to determine things such as what advertisements to display to a visitor and what fees should be paid to various external advertisers.

One conventional method for generating analytic data on users of network-connected software applications is through the use of analytic elements (e.g., "tags"). As used here, an "analytic element" or "network-based analytic element" comprises executable portions of code embedded within a website or application that are used to track a user. For example, a network-based analytic element may comprise a network request initiated by a client based upon content that is delivered to the client. Oftentimes, the analytic element can communicate information to an analytic system for tracking users of a network-connected software application. As used herein, a "network-connected software application" can comprise any application that accesses resources over a local or wide area network, such as an internet browser. In at least one conventional form, such as when used in context of an internet web browser, a tag is a hidden element within a webpage that causes some action to occur on a webpage when it is fired.

For example, in at least one implementation, a network-based analytic element comprises a tag. A tag is a piece of code that is placed within a webpage and allows a webpage owner to track information about the visitors who download and execute the particular piece of code. For example, a tag can comprise a transparent GIF or a tracking pixel, which is placed within the code of a webpage. The actual transparent GIF or tracking pixel can be stored on a separate server from the actual webpage. The tag is fired when the browser requests the transparent GIF or tracking pixel from the separate server. When the separate server receives the request from the browser, the server can gather various analytic data about the requestor.

Similar methods can also be used within applications to generate analytic data on the application users. For example, many applications, especially mobile applications, request data (e.g., via HTML, code) from remote servers and display content within the application based upon the received data. As used here, a "webpage" and/or "webpage source code" comprise information received from a web resource, such as a webserver. As such, a "webpage" and/or "webpage source code" can comprise an entire rendered website or a single advertisement, such as a banner ad, displayed within an internet browser or within an application, such as a video game. The displayed content may take the form of in-game advertisements, video content, music content, and other similar content. Similar to the tags described above in webpages, tags can be executed within the application that allows a server to gather various analytic data about the application user.

Once executed, an analytic element can gather information such as the visitor's origination (e.g., the referring webpage or search engine), what keywords were used to find the webpage, whether a particular advertisement directed a visitor to the page, and other related data. In many situations, a single webpage can comprise multiple analytic elements from a variety of different parties. For example, a particular webpage may contain a GOOGLE Analytics tag, a FACEBOOK tag, a page-counter tag, a weather tag, and other similar analytic elements.

Properly and efficiently tracking large websites with thousands to millions of unique analytic elements and applications with similarly large collections of analytic elements can be a tremendously challenging undertaking. This is exacerbated when, for example, individual pages of websites are updated, and the associated analytic elements lose relevance or otherwise become out of sync. As an additional example, a website administrator may set out a set of attributes associated with analytic elements as they should exist within the website, yet the actual implementation of these analytic elements within the website may not match the administrator-defined attributes. As before, updating the website may force the analytic elements out of sync with the administrator-defined set of attributes. An administrator may not have the resources to individually monitor each of the thousands to millions of unique analytic elements and applications to ensure they are properly configured or even working properly.

Accordingly, there are a number of problems in the art relating to the creation and implementation of rules for a tag management system that can be addressed.

BRIEF SUMMARY OF THE INVENTION

Implementations of the present invention comprise systems, methods, and apparatus configured to manage a configuration of analytic elements. In particular, implementations of the present invention comprise computer systems for identifying a dataset comprising analytic elements and some associated attributes and defining rules that describe these analytic elements and their associated attributes. The computer system can capture and analyze network communication data to identify specific analytic elements and/or specific attributes of specific analytic elements that fail to conform to the rules.

At least one implementation comprises a computer system for managing a configuration of network-based analytic elements. The computer system can be configured to access, at a universal resource locator (URL), a web resource comprising one or more webpages associated with the web resource. Each of the one or more webpages is represented at least in part by webpage source code. The computer can also be configured to parse the webpage source code associated with the one or more webpages. The computer system can then identify within the webpage source code a dataset of information. The dataset of information comprises a plurality of network-based analytic elements executable within a network-connected software application, and one or more webpage source code attributes that comprise information relating to the rendering of the webpage source code.

Based on the dataset of information, the computer system can define a first rule configured to associate at least one network-based analytic element selected from the plurality of network-based analytic elements with a webpage source code attribute selected from the one or more webpage source code attributes. Additionally, the computer system can store the first rule within a digital database, the digital database comprising a set of rules configured to describe attributes of the plurality of network-based analytic elements. Further, the computer system can receive new webpage source code associated with one or more new webpages. Further still, the computer system can identify a non-conforming network-based analytic element that does not conform to the first rule.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
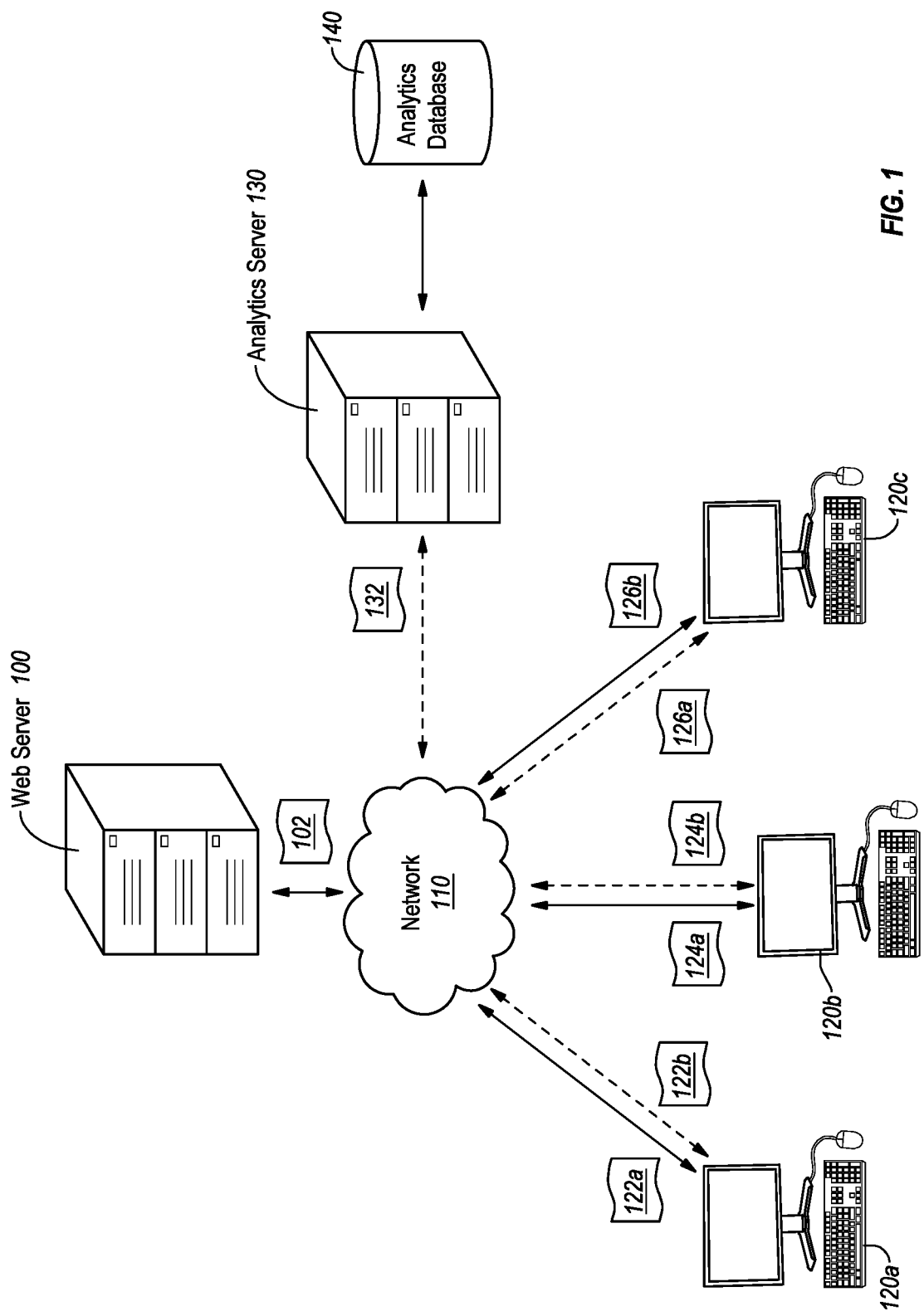
FIG. 1 illustrates a schematic of a network-based analytic element tracking system in accordance with implementations of the present invention.

The present invention extends to systems, methods, and apparatus configured to manage a configuration of analytic elements. In particular, implementations of the present invention comprise computer systems for identifying a dataset comprising analytic elements and some associated attributes and defining rules that describe these analytic elements and their associated attributes. The computer system can capture and analyze network communication data to identify specific analytic elements and/or specific attributes of specific analytic elements that fail to conform to the rules.

Accordingly, implementations of the present invention can significantly increase the reliability of network analytic information. For example, in some cases, analytic elements may be expected to be associated with a predefined set of attributes. One or more rules are derived from the predefined set of attributes and compared against an analysis of a network-connected software application implementing the analytic elements. The analysis reveals that the actual data being received by an external analytics server from the implemented analytic elements—or even attributes of the analytic elements, themselves—fail to match the rules identified for the expected attributes. Upon identifying violated rules, implementations of the present invention can identify the non-conforming analytic elements, and in some implementations, generate a report notifying a system administrator of the non-conforming analytic elements. As used here, the term "non-conforming" refers to an analytic element (or an attribute of an analytic element) that fails to match a defined rule or configuration for that analytic element (or attribute of that analytic element).

Additionally, the report can comprise information indicating the configuration of the non-conforming analytic elements within the network-connected software application and any additional information of interest that was found within the analysis of network communications derived from the implementation of analytic elements within the network-connected software application. For example, disclosed embodiments identify other analytic elements that are associated with the non-conforming analytic element. As used herein, a network-connected software application may comprise any software application that receives data over a local or wide-area network, such as a web browser that is executing HTML, code. The HTML code may comprise analytic elements in the form of HTML tags. A website may comprise multiple HTML webpages, and an individual HTML webpage may comprise multiple tags. Some tags may be represented on multiple pages.

At least one disclosed embodiment provides information about the level and/or frequency of a tag being identified as non-conforming. One will understand that "tags" are used herein merely as an example, and in additional or alternative embodiments the same examples could be applied more generally to analytic elements. That is, for example, a tag may conform to a defined rule on a first HTML webpage but may be non-conforming to the same defined rule on a second HTML webpage. A tag may become non-conforming for a variety of reasons. For example, the tag may have been coded and/or implemented improperly on the second webpage, or the second webpage may, additionally, or alternatively, have been updated, causing the tag to be out of sync with the rule. In some disclosed embodiments, the system, in addition to—or alternatively from—generating a report, makes changes to the non-conforming tag so that the tag conforms to the violated rule after the changes.

In some cases, the frequency or trend of non-conforming tags can be indicative of a stale rule or a change in content implementation. For instance, the dataset used to define the expected or predefined set of attributes may be derived from a tag configuration database curated by a user and/or database administrator, but the tag configuration database does not reflect the actual implementation of tags within content. In some disclosed embodiments, the system, upon identifying non-conforming tags, defines an updated rule based on the non-conforming tags. Additionally, or alternatively, the system can enforce the updated rule by making changes to the source code of any tags affected by the updated rule such that these tags conform to the updated rule.

By providing the foregoing, disclosed embodiments allow a database housing configuration data to automatically and accurately reflect the most recent changes made to analytic elements, and in some implementations, it ensures consistency between associated analytic elements by adapting non-conforming analytic elements to the proper configuration as provided in the configuration database. This may be particularly advantageous if implemented in circumstances where the content is fluid or highly volatile. For example, many websites are routinely updated (e.g., news websites) and are often times associated with a staging site or other pre-launch environment where functionality is assured before going live. Due to the often non-visible nature of HTML, tags (or other analytic elements) as, for example, when the HTML tag represents a transparent pixel, it is difficult to determine whether recent changes to website content has negatively affected the reliability or coherence of tags between pages. Tests may be able to determine that tags retain certain amounts of functionality (e.g., that the tags fire), but those tests fail to relate the functionality with conformity of the tags to a prescribed set of rules. By utilizing implementations of the present invention, the tags can be fully vetted for both functionality and coherence, thereby enriching the ability of an administrator to manage tags and/or tag configurations, particularly at scale and over time.

Accordingly, disclosed embodiments provide significant technical advancements within the field of analyzing and managing analytic element network traffic. In particular, disclosed embodiments determine that analytic elements that are expected to be aligned with a predefined configuration are in fact not conforming to the predefined configuration and enables changes to the non-conforming analytic elements or updates to the configurations to be made accordingly. This increases the efficiency and utility of analytic elements within a system. Additionally, disclosed embodiments provide an end-user with valuable information for intelligently correcting errors within analytic elements.

Turning now to the figures, FIG. 1 illustrates a schematic of a network-based analytic element tracking system in accordance with implementations of the present invention. In particular, FIG. 1 depicts a group of end-user computers 120(a-c) in communication with a web server 100 through a network connection 110. One will understand that the depicted schematic is merely exemplary and that far more than three end-user computers 120(a-c) may be in communication with a web server 100 over a network connection 110. Additionally, in at least one implementation, mobile computing devices instead of, or in addition to, the end-user computers 120(a-c) can request data from the web server 100 through the network 110.

In at least one implementation, each end-user computer 120(a-c) requests 122a, 124a, 126a data from web server 100. The requests 122a, 124a, 126a may be generated from within web browsers, software applications, or any other location within the end-user computers 120(a-c). In response to the request 122a, 124a, 126a for data, the web server 110 may transmit back to each respective end-user computer 120(a-c) the requested data 122b, 124b, 126b, along with an analytic element 102.

In at least one implementation, the analytic element 102 comprises an HTML, tag, such as a transparent pixel request, that requests data from a remote analytics server 130. When executed, the analytic element 102 can cause the end-user computers 120(a-c) to each request data 122a, 124a, 126a from the remote analytics server 130. When receiving the requests 122a, 124a, 126a from the end-user computers 120(a-c), the analytics server 130 can log the requests 122a, 124a, 126a, log any associated variables, log various analytic information about the requests 122a, 124a, 126a, and store the information within an analytics database 140. The analytics server 130 can then communicate the transparent pixel 132, for example, to the end-user computers 120(a-c).

While the above description is provided with respect to HTML tags, in at least one implementation, the present invention easily adapts to alternative analytic tracking methods. For example, some analytic methods do not rely upon tags that fire requests to external servers. Instead, some analytic methods gather all of the analytic data of interest within the web server 100. In such a case, the web server 100 can store the gathered analytics data within the analytics database 140, which may be local to the web server 100.

Accordingly, FIG. 1 depicts a schematic of an implementation of a system for gathering analytic information. As depicted, the analytics server 130 can gather information from a large number of end-user computers 120(a-c) that are accessing a web server 100 (and accompanying website) of interest. Additionally, various different webpages hosted by the webserver 100 may comprise unique analytic elements that comprise various specific attributes such as, but not limited to, specific variables, specific names, specific paths, and other similar characteristics. Each of these specific attributes may be pre-determined by a website administrator in order to efficiently track the desired analytic information. For example, specific webpages may be associated with a language variable that can be stored within the analytics database 140. The language variable may be informative to the website administrator in identifying what language to generate new content in, what language advertisements should be provided in, and various other demographic specific determinations.

In at least one implementation of the present invention, a set of rules are generated based on information provided by an end user. An "end-user" as used herein includes any end-user or administrator, and as understood by one having ordinary skill in the art, an end-user may include an administrator and can be interchangeable therewith where appropriate. An end-user may generate or otherwise provide a configuration table that includes at least a portion of analytic elements and in some implementations one or more attributes or configurations for the analytic elements. This information can be used to generate a set of rules that may, in turn, be checked against a set of analytics data.

Figure 2:
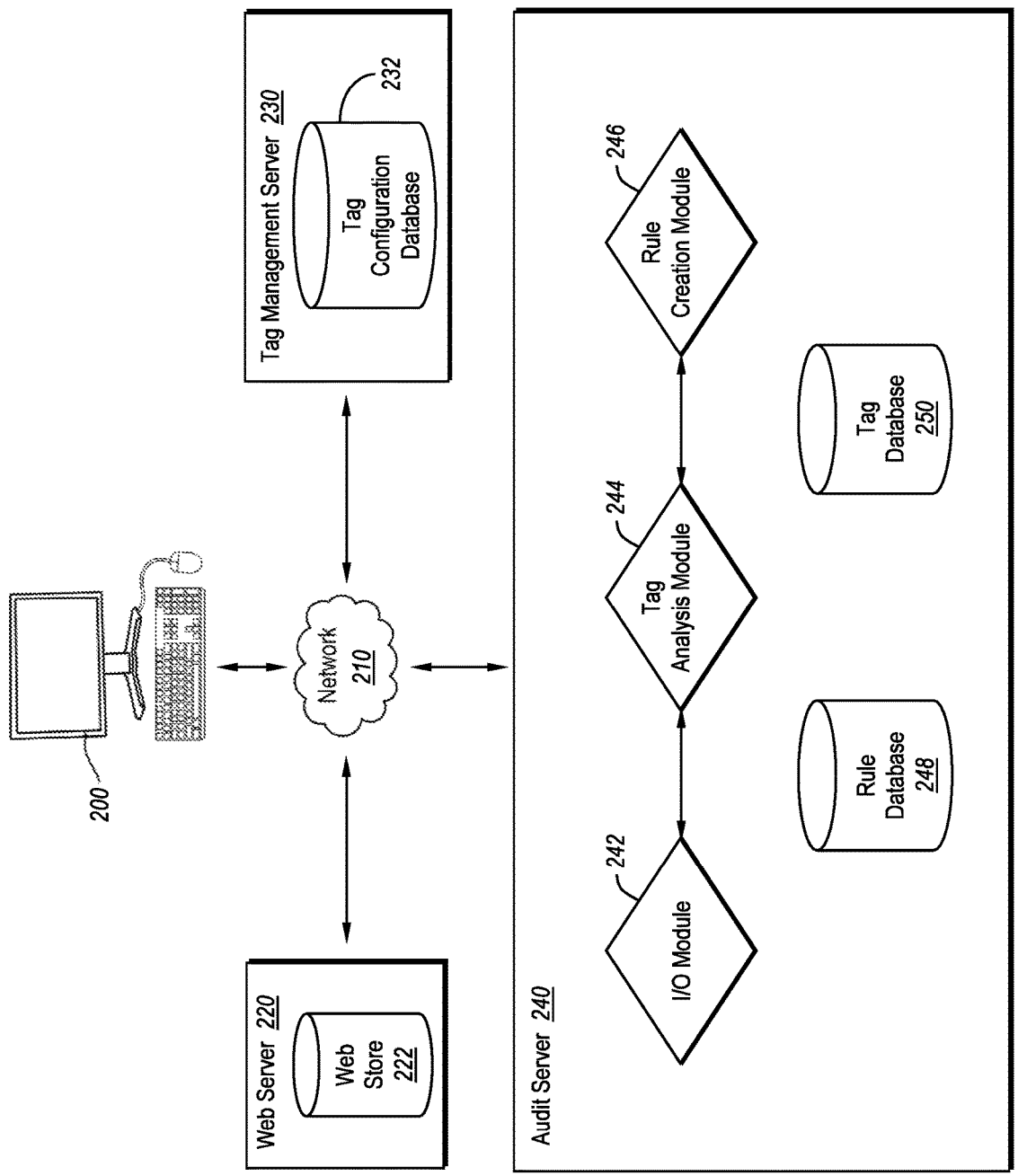
FIG. 2 illustrates a schematic of a network-based analytic element audit system in accordance with implementations of the present invention.

FIG. 2 illustrates a schematic of a network-based analytic element rule-creation and management system in accordance with disclosed embodiments. As depicted in FIG. 2, an administrator (or end user) may use a network-connected computer system 200 to communicate with one or more servers, such as a web server 220, a tag management server 230, and/or an audit server 240. Although depicted as separate servers in FIG. 2, it should be appreciated that any of the aforementioned servers can be distributed between one or more additional servers and/or any of the aforementioned servers can be localized to the same server as any of the other aforementioned servers.

In at least one disclosed embodiment, an administrator accesses a network-based computer system 200 and provides a dataset of information to a tag management server 230 over a network 210. The dataset of information includes a listing of analytic elements together with any attributes associated with the analytic elements (e.g., specific variables, specific names, specific paths, configurations, and other similar characteristics). The dataset of information can be stored within a tag configuration database 232 of the tag management server 230. Additionally, or alternatively, the dataset of information is incorporated into an existing dataset stored within the tag configuration database 232. Regardless of the path by which the tag configuration database 232 is populated, the information provided thereto represents an administrator's expected configuration of analytic elements.

A set of rules can be generated from the information provided within the tag configuration database 232. In at least one implementation, the I/O module 242 of audit server 240 accesses and/or receives tag information stored in the tag configuration database. Once the tag information has been received by the I/O module 242, the I/O module 242 can provide the information to the tag analysis module 244. The tag analysis module 244 can identify attributes of the analytic elements (or tags) within the data that can be used to define rules describing the attributes and may additionally, or alternatively, analyze the data and identify patterns.

The tag analysis module 244 can implement any of a number of known pattern recognition algorithms to identify patterns within the tag information. For example, the tag analysis module 244 may identify that a majority of the tag information comprises a bread crumb naming convention (e.g., "main>store>furniture>beds>Kids Pirate Bed"), while a few outliers comprise a URL-based naming convention. Similarly, the tag analysis module 244 may identify that at least a portion (e.g., a majority) of analytics elements within a specific set of attributes also comprise a language variable. Additionally, in at least one implementation, the tag analysis module 244 may identify a pattern between particular analytic elements and webpage source code attributes, such as content within a webpage itself. For example, a particular analytic element may be associated with webpages that have a high frequency of the word "entertainment." The identified content within the webpage may be identified in a rendered or unrendered state. As used herein, "webpage source code attributes" comprise any attributes of a webpage either rendered or unrendered. One will understand that the above stated patterns are merely exemplary and that conventional pattern recognition algorithms are capable of identifying a wide variety of additional patterns.

The tag analysis module 244 can communicate the identified attributes and/or the identified patterns to the rule creation module 246. In at least one implementation, the rule creation module 246 can be configured to create an analytics rule based upon one or more of the attributes and/or identified patterns and store the rule within the rule database 248. For example, the rule creation module 246 can create a rule that the analytic elements associated with the web server 220 should all comprise a bread crumb naming convention. The resulting rule may describe the format for the bread crumb naming convention and may be stored within rule database 248 for later reference and application, as described below.

In at least one implementation, the dataset of information provided by the tag configuration database is incomplete. For instance, an administrator may fail to list each analytic element or all the attributes associated with each analytic element, making the information within the tag configuration database 232 represent only a fraction of the available analytic elements stored within a tag database 250 comprising known tag elements and/or attributes. Consequently, the rule database 248 may only account for a portion of the available analytic elements.

In some implementations, the tag configuration database 232 may be complemented to resolve this issue. For example, the tag management server 230 may communicate with the web server 220 and access the content (e.g., scanning the source code) available in the web store 222. The tag management server 230 can thereby populate the tag configuration database 232 with any missing information.

In at least one implementation, the foregoing may be enabled by audit server 240. Particularly, the tag analysis module 244 may compare the rules within rule database 248 with known analytic elements and/or their attributes stored within tag database 250. Upon identifying a discrepancy, the I/O module 242 may access web store 222 of web server 220 through the network 210 and scan the source code of content available therein to identify analytic elements and/or attributes associated therewith. The I/O module can output that information to the tag configuration database 232 where non-overlapping information is incorporated.

It should be appreciated that complementing the tag configuration database with missing analytic elements or missing attributes can be done by any method known in the art, making the foregoing an exemplary, non-limiting example of how a system can identify an incomplete tag configuration database and subsequently complement the missing information. Illustrating this point, an additional method for complementing the tag configuration database is provided farther below and includes identifying analytic elements and attributes of analytic elements discovered through simulating and/or rendering content from the web server and supplying any of these identified analytic elements or attributes to the tag configuration database to supplement the information already contained therein.

Thus, a set of rules can be generated from the information provided within the tag configuration database 232, whether by using a complemented tag configuration database 232, by simply using the dataset of information provided by an administrator, or by other methods described herein. The set of rules defined therefrom are configured to describe attributes of analytic elements and may be applied against captured network communications comprising analytic information to determine if the captured information conforms with the rules. Upon identifying a non-conforming communication (e.g., a network request initiated by an implemented analytic element that fails to adhere to one or more rules associated with that analytic element), tag analysis module 244 may identify the non-conforming analytic element that, when executed, initiates the non-conforming communication.

In one implementation, the audit server 240 may generate a report indicating the non-conforming analytic element(s) and/or the non-conforming attribute(s) and send the report to the network-connected computer system 200. Additionally, the report may include suggested alterations to the source code or attributes of the offending analytic elements. The report may additionally, or alternatively, include suggested alterations to the tag configuration database.

In at least one implementation changes are automatically made to information within the tag configuration database 232 and/or within the source code of analytic elements at web server 220. With reference to implementations where changes are made to information within the tag configuration database, the audit server 240 can, as described above, identify non-conforming analytic elements and/or the non-conforming attributes thereof. The tag analysis module 244, for example, may identify what changes, if made to the tag configuration database, would result in the non-conforming analytic element conforming with the rules. These changes can be transmitted to and implemented within the tag configuration database 232, at least in part, by I/O module 242. The tag analysis module 244 may then access the updated information within the tag configuration database 232 and pass the updated information to the rule creation module 246, where an updated rule can be generated and stored within rule database 248. In doing so, the non-conforming analytic element, when executed and compared to rule database 248 will not report as non-conforming. In some implementations, the source code for the non-conforming analytic element may be changed so that it conforms to the rule. This may be performed in a similar fashion as described above.

In at least one implementation, the rule creation module 246 must first determine if the non-conforming analytic element should serve as the archetype for a new rule or whether the non-conforming analytic element should be changed to conform with the rule. For example, in various implementations, the tag analysis module 244 may identify non-conforming attributes and/or analytics elements that represent only a portion of the analytics information. In determining whether to create a rule from non-conforming attributes and/or analytic elements or to change the properties/analytic elements to conform to the rule, the rule creation module 246 can determine whether the non-conforming attributes and/or analytic elements were identified in more than a threshold portion of the analytics information. For example, if the non-conforming analytic elements constitute ninety-nine percent of the analytics information for a given rule, the rule creation module 246 may determine that the conforming analytic elements comprise outliers and that the rule should be created. In various implementations, the threshold amount may vary based upon user entered criteria or may be less than ninety-nine percent such as, for example, a threshold amount of fifty percent, sixty percent, seventy percent, seventy-five percent, eighty percent, eighty-five percent, ninety percent, or increments there between.

Additionally, various rule seeds can be provided to the rule creation module 246. The rule seeds may comprise common rule templates. For example, a rule seed may be associated with the bread crumb naming convention. Additionally, a website specific rule seed can be provided that describes specific variable types that should be associated with specific analytic elements. Using the rule seeds, the rule creation module 246 can create rules based upon patterns that would fit within the particular rule seeds.

In at least one implementation, the rule creation module 246 can also search the rule database 248 for analytic rules, before creating a new rule. For example, the rule creation module 246 may determine that an identified pattern is already described by a rule within the rule database 248. In contrast, in at least one implementation, the rule creation module 246 can determine that a pattern is only partially described by a rule within the rule database 248. For example, a rule may exist that requires a certain variable to be associated with a particular group of analytic elements. The rule creation module 246, however, may determine that a pattern is present which associates an additional variable with the particular group of analytic elements. Based upon that determination, the rule creation module 248 can either adjust the pre-existing rule to include the additional variable or create a new rule that describes the identified pattern.

In determining whether a pre-existing rule should be changed or replaced, the rule creation module 248 can analyze the age of the pre-existing rule, whether the pre-existing rule is associated with a write-protection flag, whether the identified pattern is wide spread, and the age of the analytic information. For example, the rule creation module 248 may analyze the age of the pre-existing rule by determining that recently created rules should not be changed for a threshold period of time. Similarly, the rule creation module 248 may analyze the age of the pre-existing rule by determining that long-existing rules should be given deference, unless a majority of the analytics data violates the rule. In such a case, the rule creation module 246 can create a user-directed prompt to determine if the old rule should be changed or overwritten.

Similarly, the rule creation module 248 can give deference to a rule that is newer than the analytics elements. For example, the rule may be recently created by the website administrator, and the identified additional variable may be non-conforming. As such, in at least one implementation the rule creation module will not manipulate a pre-existing rule that is newer than the analytics information in which the pattern was identified. Further, in at least one implementation, a user may be able to explicitly set a write-protection flag with one or more rules that prevents the rule creation module 246 from overwriting or adjusting the rule. In doing so, the write-protection flag may essentially allow the affected rules to become a baseline from which analytic elements or their properties are conformed.

As an additional example, rule creation module 248 can analyze multiple time-separated capture events to determine a trend in the frequency of non-conforming analytic elements to influence the likelihood of creating a new and/or updated rule. For example, an analytic element may present as non-conforming over a series of time points. At an initial time, few of the analytic elements that share the attribute present as non-conforming, but at later time points, or as otherwise determined over time, a greater number of analytic elements present as non-conforming (i.e., the frequency of the non-conforming element increases). In such a scenario, the rule creation module 246 may determine that the increasing frequency merits a new rule and may consequently cause a change to information within the tag configuration database such that the new rule may be formed based on the updated information. This may additionally cause all affected analytic elements to conform to the new rule by making changes to their respective source code. In a similar fashion, a decreasing frequency may result in the rule creation module 246 not generating a new rule. Instead, the non-conforming analytic elements may be changed to conform with the rule.

In one implementation, the foregoing time-dependent determination of rule generation may be set by thresholds. For example, the rule creation module 246 will not make the determination of whether or not to generate a new rule until a non-conforming analytic element has presented at a threshold number of time points. The rule creation module may, therefore, allow trends in changes to analytic elements to dominate the rule making process. For instance, a new rule may not be created unless two (or three, or four, or five, or ten, or twenty) time points register the same non-conforming analytic element and a frequency can be determined therefrom.

Captured network communications, as provided above, inform the rule creation process and/or the management of rules and analytic elements. Network communications may be captured in various ways and as exemplified in FIGS. 3 and 4. Also, as provided above, the tag configuration database 232 can be complemented with information derived from simulating and/or rendering content on web servers in analogous fashions to those exemplified in FIGS. 3 and 4.

As used herein, the term "analogous" generally connotes a comparable relationship between two things. For example, methods carried out in comparable ways (or even substantially the same way) or with comparable (or substantially the same) components, modules, etc., are understood to be analogous. In some instances, the term "analogous" connotes a counterpart of one or more components, modules, analytics elements, etc. For example, a website with multiple web pages may have multiple analytic elements on each web page. A first web page includes a first analytic element with a counterpart analytic element on a second page. The counterpart is deemed analogous to the first analytic element because it is comparable in certain respects to the first analytic element. This may include the counterpart being a duplication of the first analytic element's source code, or it may simply include the counterpart having comparable functionality as the first analytic element (e.g., reports the same types of information).

Figure 3:
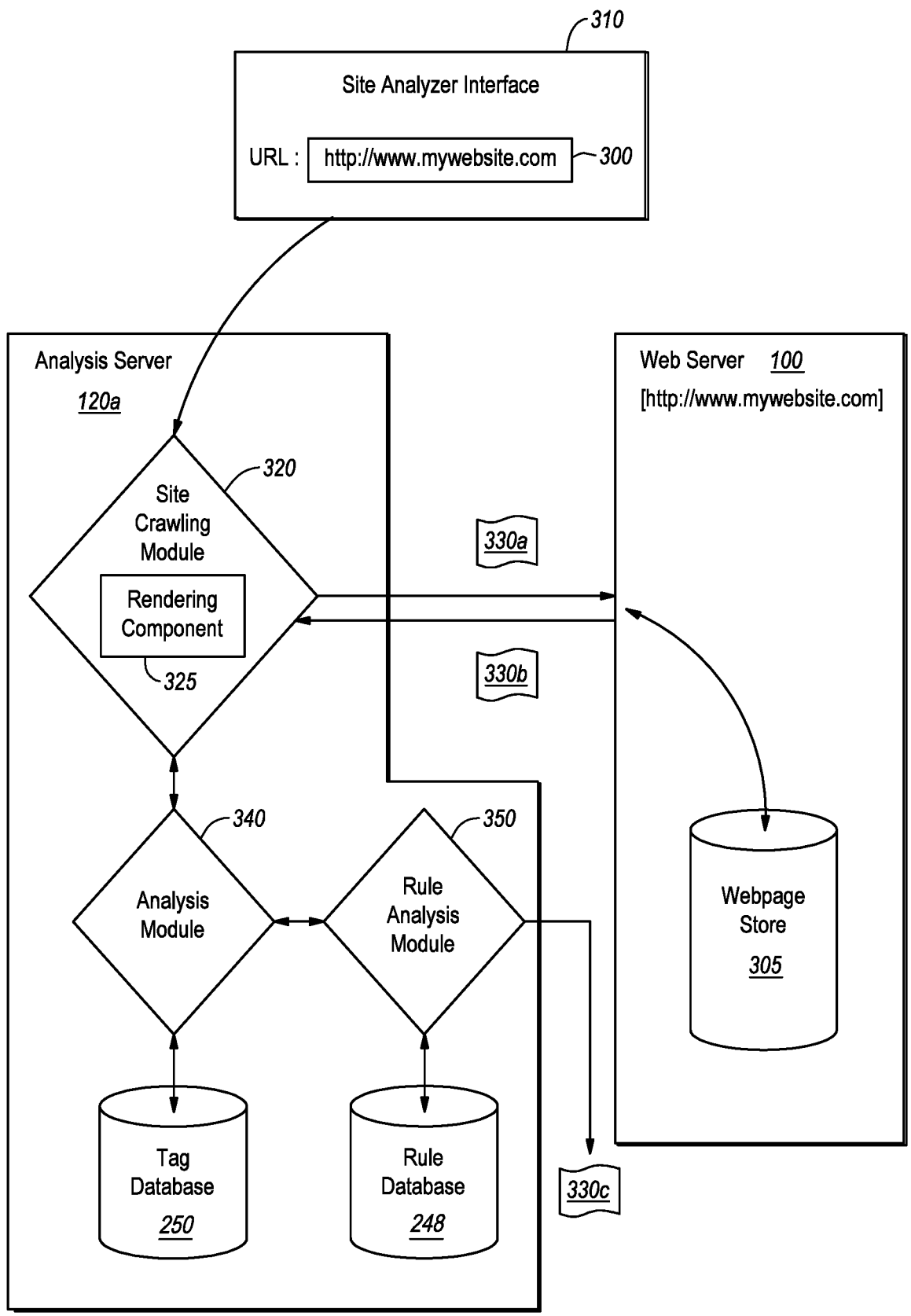
FIG. 3 illustrates a schematic of another network-based analytic element audit system in accordance with implementations of the present invention.

Referring now to FIG. 3, FIG. 3 illustrates a schematic of a network-based analytic element audit system in accordance with implementations of the present invention. The network-based analytic element audit system may be executed within an analytics server 130, a web server 100, a network-connected computer system 200, or within an end-user computer 120*a* that is configured to audit webservers. For simplicity and clarity, the examples provided herein will relate to a network-based analytic element audit system executed by the end-user computer 120*a*. In at least one implementation, the network-based analytic element audit system can generate a site analyzer interface 310 at the end-user computer 120*a* (i.e., the analysis server). The analysis server 120*a* receives from the site analyzer interface 310 a URL 300 to be analyzed. The analysis server 120*a* comprises a site crawling module 320, an analysis module 340, a rule analysis module 350, a tag database 250, and a rule database 248.

The analysis server 120*a* can access the provided URL 300 and communicate with the web server 100 that is associated with the URL 300. As depicted in FIG. 3, the web server 100 can comprise a webpage store 305, where the actual website content is stored. For example, a webpage store 305 can store the source code of each webpage of a website. Additionally, a webpage store 305 can store multimedia content that is accessible through the webpages.

In FIG. 3 and throughout the present application, web server 100 is depicted and described as being a unitary system. One will understand, however, that a web server 300 can be composed of multiple servers and multiple webpage stores 305. In at least one implementation, the analysis server 120*a* can access the webpage stores 305 on each of the servers that is associated with a particular webpage.

FIG. 3 shows that a user can enter a URL 300 into a site analyzer interface 310. The site analyzer interface 310 can then communicate the URL 300 to the analysis server 120*a*. In this application, a URL 300 of "http://www.mywebsite.com" is used for exemplary purposes, but one will understand that any number of different URLs 300 can be entered into the site analyzer interface 310.

In at least one implementation, the URL 300 is provided to the analysis server 120*a* directly from an application, such as a mobile phone game. For example, the mobile phone game may comprise in-game advertisements. The in-game advertisements may be loaded through URLs embedded within the game's source code. Additionally, in at least one embodiment, the analysis server 120*a* is in communication with a virtual machine that is executing the mobile phone game.

Once the analysis server 120*a* has received the URL 300, the site crawling module 320 sends communication packets 330*a* to the web server 100 that is associated with the URL 300 and receives response communication packets 330*b* from the web server 100. In the depicted case, the site crawling module 320 accesses http://www.mywebsite.com. Specifically, the site crawling module 320 accesses the webpage store 305 that is associated with the web server 100. In at least one implementation, the site crawling module 320 can then crawl, using methods that are known in the art, through the entire website that is associated with URL 300.

In at least one implementation, the site crawling module 320 can include a rendering component 325. The rendering component 325 renders the information contained in the packets 330*b* that are received from the web server 100. For example, the rendering component 325 can render a JAVA or FLASH portion of a webpage. Once rendered, the site crawling module 320 crawls the rendered portion of the webpage and identifies additional tags that were not otherwise visible.

In some cases, crawling a rendered webpage may provide additional information than what would be available if only the source code is crawled. For example, a particular webpage may contain multimedia content that contains web source code attributes of interest that are only visible when the multimedia content is activated. In at least one implementation, the rendering component 325 can enable the site crawling module 320 to access these web source code attributes of interest by rendering and activating at least a portion of the digital content that is embedded within a webpage that is stored within the webpage store 305.

As the site crawling module 320 crawls a website, the data 330*b* that is received from the webpage store 305 is sent to the analysis module 340. The analysis module 340 parses the data 330*b*, including the webpage source code associated with the one or more webpages. The analysis module 340 analyzes the webpage content to identify tags that are associated with each webpage of the website. Additionally, in at least one implementation, the analysis module 340 determines the configurations of identified tags. For example, in at least one implementation, the analysis module 340 determines that specific variables are associated with a particular tag. These data may, in one or more implementations, be used to complement information within tag configuration database 232.

In at least one implementation, the analysis module 340 also receives rendered information from the rendering component 325 of the site crawling module 320. The analysis module 340 parses the rendered information. The analysis module 340 analyzes the rendered information and identifies tags that are associated with a particular webpage. For example, in at least one implementation, the analysis module 340 identifies a tag as the tag is executed. For example, the analysis module 340 identifies that a particular piece of code requests information from either an unidentified server or from a server that is known to be associated with tag products. As an additional example, the analysis module 340 identifies that a particular word or phrase commonly appears within the rendered information and the word or phrase is associated with particular analytic elements (e.g., tag products).

Further, in at least one implementation, the analysis module 340 identifies tags that are associated with rich content or multimedia content. For example, in some multimedia files, tags are configured to fire at particular points in the multimedia file, allowing the multimedia provider to identify how much of a particular file was viewed. In at least one implementation, the analysis module 340 analyzes the entire multimedia file and identify the tags and configurations of tags that are associated with the multimedia file.

In at least one implementation, the analysis module 340 identifies the tags that are associated with each webpage by referencing a tag database 250. For example, the analysis module 340 can compare the source code of a particular website to all of the known tags within the tag database 250. For instance, the analysis module 340 may analyze a particular webpage that contains a FACEBOOK tag. The analysis module 340 compares the source code of the particular webpage to known tags that are contained within the tag database 250. The tag database 250 may contain a signature of the FACEBOOK tag. Using the signature for the FACEBOOK tag that is stored in the tag database 250, the analysis module 340 identifies that the particular webpage contains a FACEBOOK tag.

In at least one implementation, the signatures within the tag database 250 may be actual copies of the known tags. In another implementation, the signatures may be based upon specific attributes of tags, such that the analysis module identifies a tag by identifying the specific attributes within a portion of the data 330*b* communicated from the site crawling module 320.

Additionally, in at least one implementation, the tag database 250 also contains characteristics that are associated with each tag. For example, the data database may contain information about the variables, if any, that are commonly associated with specific tags. In addition, the tag database 250 may also contain information about past version of tags, such that the analysis module 340 can identify whether a particular tag is up-to-date. Further, in at least one implementation, the tag database 250 may contain information that enables the analysis module 340 to identify undesirable tags (e.g., tags that are deemed unsecure, tags that steal user information, etc.).

After identifying at least one tag, the analysis module 340 communicates with the rule analysis module 350. In at least one implementation, the analysis module 340 communicates the tag identity, configuration, and associated webpage to the rule analysis module 350. For example, the analysis module 340 communicates to the rule analysis module 350, that a Google Analytics tag is present on webpage "http://www.mywebsite.com/page1." Further, the analysis module 340 may communicate to the rule analysis module 350 any variables that are associated with the tag.

In at least one implementation, the rule analysis module 350 retrieves one or more rules from the rule database 248 and verifies whether the identified tag conforms to the rules. For example, the rule analysis module 350 determines whether the tag follows the proper bread crumb naming convention. Based upon the determination of the rule analysis module 350, various actions can be taken, as explained below.

As indicated above, the analysis server 120*a* may be configured to perform a walk-through of a particular website. The walk-through may comprise pre-loading a particular user profile and stepping through pages on a website. The particular user profile may comprise cookie information that is intended to translate into specific analytic element attributes, such as language. The analysis server 120*a* can analyze webpage source code attributes and track network communications to identify analytic elements (e.g., tags) that fire in response to the walk-through of the website. The rule analysis module 350 can then compare the analytic element behaviors to rules stored within the rule database 248. Based upon the determinations of the rule analysis module 350, an analytic element report 330*c* can be generated. The report 330*c* describes various identified analytic elements that violated one or more rules.

In at least one implementation, the report 330*c* may also comprise source code that the rule analysis module 350 generated to correct the non-conforming analytic elements. For example, a particular tag may comprise an incorrect naming convention. The rule analysis module 350 may automatically generate source code for the tag that conforms with the naming convention. Additionally, in at least one implementation, the generated source code can be automatically provided to the web server 100 and incorporated into the webpage store 305. As such, in at least one implementation, the rule analysis module 350 can identify non-conforming analytic elements and automatically generate code that can replace the non-conforming analytic element source code. Additionally, or alternatively, the associated rule may be updated by any implementation described above with reference to FIG. 2.

Figure 4:
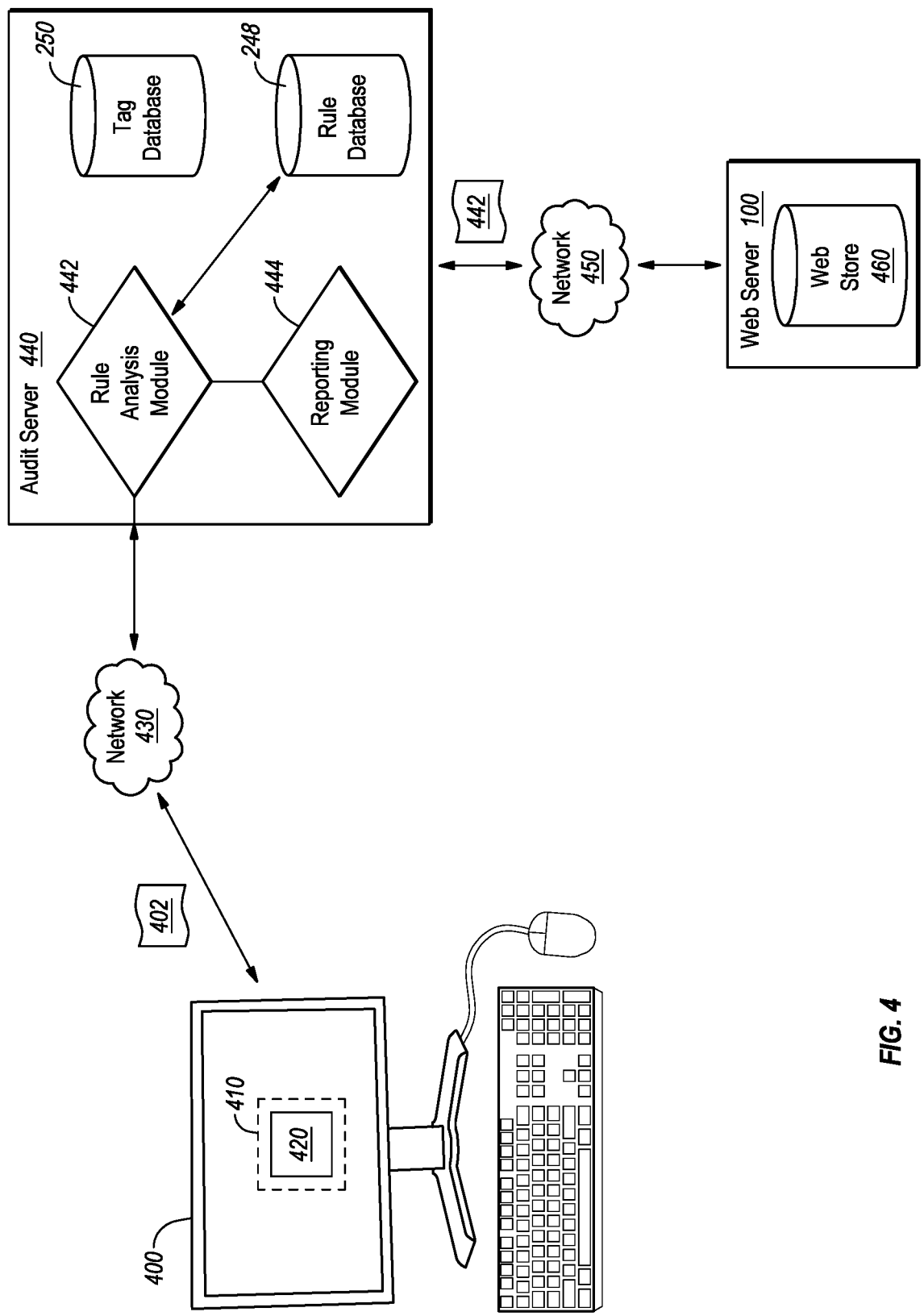
FIG. 4 illustrates a schematic of yet another network-based analytic element audit system in accordance with implementations of the present invention.

FIG. 4 illustrates a schematic of another network-based analytic element audit system in accordance with implementations of the present invention. The schematic of FIG. 4 has been simplified to only show portions of interest. The network-based analytic element audit system of FIG. 4 comprises a system for analyzing web-connected software applications. For example, in at least one implementation, a mobile application 420 is executed on an end-user computer 400 within a virtual machine 410. The network communications 402 generated by the mobile application 420 is routed through an audit server 440. In at least one implementation, the audit server 440 functions as a network proxy for network communications 402 generated by the mobile application 420. While FIG. 4 depicts the end-user computer 400 and the mobile application 420 in communication with the audit server 440 through a network communication channel, in at least one implementation, the audit server 440 is executed within the same end-user computer 400 as the virtual machine 410 and the mobile application 420.

Additionally, in at least one embodiment, the audit server 440 has direct API access to the virtual machine 410. As such, the audit server 440 is configurable to directly access the mobile application 420. In at least one embodiment, the audit server 440 is able to analyze the mobile application 420 from the perspective of the mobile application 420 itself with respect to the received webpages. Accordingly, in at least one embodiment, the audit server 440 is able to identify rules that may only appear when using a particular operating system, as emulated by the virtual machine 410.

When functioning as a proxy for the mobile application 420, the audit server 440 receives network communications 402 from the mobile application 420, analyze the communications for analytic elements, and then forward the communication 442 to its intended web server destination 100. The web server 100 then gathers data from a web store 460 and communicate the data to the audit server 440, which in turn can communicate the data to the mobile application 420.

When analyzing the network communications 402, the audit server 440 utilizes a rule analysis module 442 that identifies analytic elements (e.g., tags) based upon signatures found in the network communications 402. The signatures are stored within a tag database 250. Additionally, the rule analysis module 442 analyzes the identified analytic elements to determine if they conform to rules stored within a rule database 248. The audit server 440 also utilizes a reporting module 444 to generate reports 330c similar to those described above and/or may suggest changes (or, in some implementations, automatically implement changes) to non-conforming analytic elements and/or rules associated therewith as described above.

Accordingly, FIGS. 1-4 and the corresponding text illustrate or otherwise describe one or more components, modules, and/or mechanisms for auditing and managing rules for network-based analytic elements. In particular, in at least one implementation, the present invention can analyze a dataset of analytic information in view of a set of previously defined rules. Comparing the rules to the dataset information can identify previously undetectable problems. One will appreciate that implementations of the present invention can also be described in terms of flowcharts comprising one or more acts for accomplishing a particular result. For example, FIGS. 5 and 6 and the corresponding text describe acts in a method for managing a configuration of network-based analytic elements. The acts of FIGS. 5 and 6 are described below.

Figure 5:
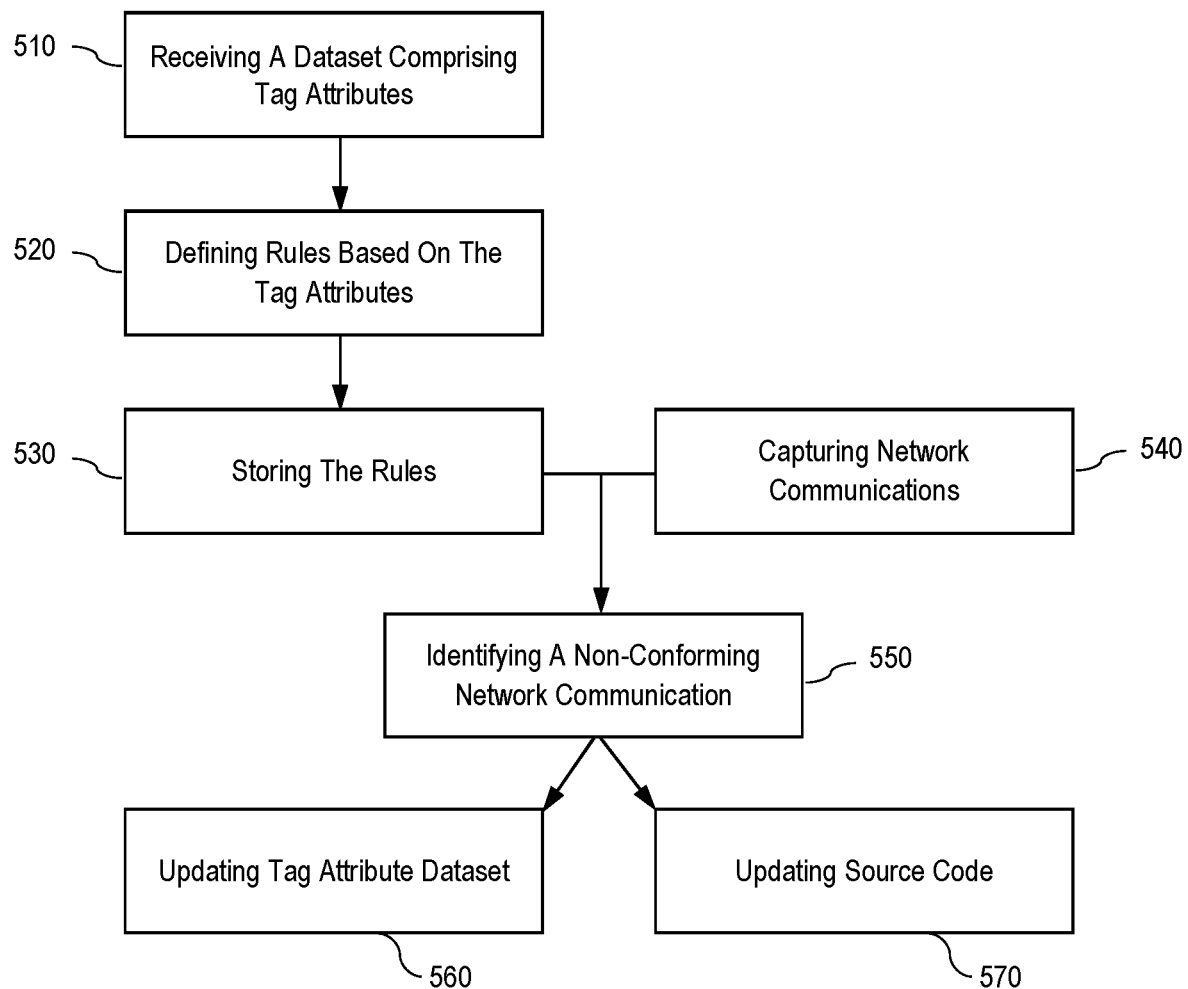
FIG. 5 illustrates a flow chart of a series of acts in a method in accordance with an implementation of the present invention to manage a configuration of network-based analytic elements.
Figure 6:
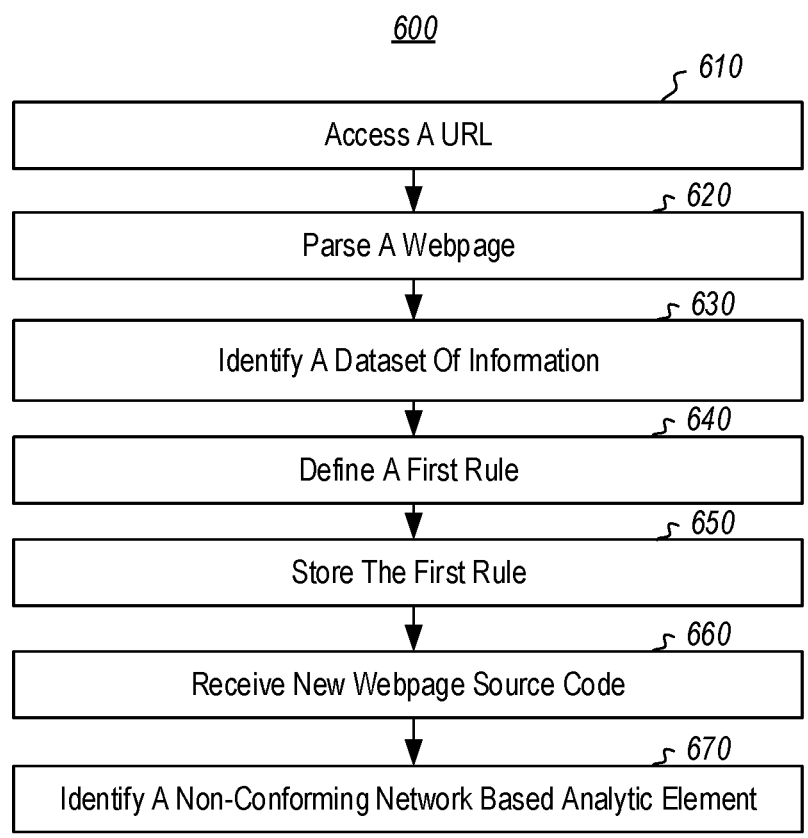
FIG. 6 illustrates a flow chart of a series of acts in another method in accordance with an implementation of the present invention to manage a configuration of network-based analytic elements.

For example, FIG. 5 illustrates that a method 500 for managing a configuration of network-based analytic elements includes an act 510 of receiving a dataset comprising tag attributes. Act 510 comprises receiving, at the computer system, a dataset of information. The dataset of information can comprise a plurality of network-based analytic elements executable within a network-connected software application, and a plurality of attributes associated with one or more of the plurality of network-based analytic elements. For example, in FIG. 2 and the associated description, a tag analysis module 244 of audit server 240 receives a dataset of information from the tag configuration database 232 over network 210. The dataset of information from the tag configuration database 232 includes a plurality of analytic elements and their associated attributes. In some implementations, the I/O module 242 of audit server 242 receives the dataset.

The I/O module 242 and/or the tag analysis module 244 may, in some implementations, be computer-executable components, hardware components, or a combination of computer-executable components and hardware components. For example, the I/O module 242 may include hardware for connecting and communicating over a network 210 and computer-executable components configured to pass received information to, for example, the tag analysis module 244.

Additionally, FIG. 5 illustrates that the method 500 includes an act 520 of defining rules based on the tag attributes. Act 520 comprises defining a first rule configured to describe at least one attribute of a first network-based analytic element within the plurality of network-based analytic elements, based on the dataset of information. For example, in FIG. 2 and the associated description, a rule creation module 246 defines rules for analytic elements where the defined rules are configured to describe at least one attribute of the corresponding analytic element(s). Further, rule creation module 246 defines said rules based on information received from tag analysis module 244, said information being derived from the dataset of information received from, for example, tag configuration database 232.

FIG. 5 shows that the method 500 includes an act 530 of storing the rules. Act 530 comprises storing the first rule within a digital database, the digital database comprising a set of rules configured to describe attributes of the plurality of network-based analytic elements. For example, in FIG. 2 and the associated description, a rule database 248 is configured to store the rules generated by the rule creation module 246. The rules may be stored, in some implementations, within rule database 248 by any means known in the art, including, for example, as regular expressions arranged in a table.

Further, FIG. 5 shows that the method 500 includes an act 540 of capturing network communications. Act 540 comprises capturing one or more network communications generated by the network-connected software application at a first time point. For example, in FIG. 3 and the associated description, an analysis server 120a simulates and/or renders content from web server 100 and captures communication packets 330b. The communication packets 330b represent, for example, server requests initiated by execution of analytic elements contained within content of webpages stored in webpage store 305 and which are being simulated and/or rendered by site crawling module 320 and/or rendering component 325 of the analysis server 120a.

Further still, FIG. 5 shows that the method 500 includes an act 550 of identifying a non-conforming network communication. Act 550 comprises identifying a non-conforming network communication within the one or more network communications, wherein the non-conforming network communication is associated with a non-conforming network-based analytic element analogous to the first network-based analytic element, and when executed, the non-conforming network-based analytic element fails to conform to the first rule. For example, in FIG. 3 and the associated description, analysis module 340 identifies non-conforming network communications by communicating with the rule analysis module 350 and rules stored within rule database 248.

FIG. 5 also shows that the method 500 includes an act 560 of updating a tag attribute dataset. Act 560 comprises changing the at least one attribute of the first network-based analytic element in the dataset of information to the non-conforming attribute. For example, in FIG. 2 and the associated description, a non-conforming analytic element can be identified by tag analysis module 244 based on rules stored within rule database 248. Further provided in the description associated with FIG. 2, the tag configuration database 232 can be accessed by I/O module 242 of audit server 242, the non-conforming analytic element identified therein that includes the non-conforming attribute, and a change implemented to the identified non-conforming attribute within the tag configuration database 232. By making such a change to the tag configuration database 232, the tag configuration database 232 is updated.

Additional examples of updating a tag attribute dataset include incorporating observed analytic information into the tag configuration database. The observed analytic information may be derived, for example, as in FIG. 3 where the results of executed content within webpage store 305 are captured by analysis server 120a. Similar observed analytic information can be obtained from web store 222 of FIG. 2. As provided in the accompanying description, observed analytic information may be used to complement the dataset of information within the tag configuration database 232. In some implementations, complementing the tag configuration database 232 with additional real-time or recently observed analytic data comprises updating the tag attribute set.

Additionally, or alternatively to act 560, FIG. 5 shows that the method 500 includes an act 570 of updating source code.

Act 570 comprises changing the source code of the non-conforming network-based analytic element so that the non-conforming network-based analytic element conforms with the first rule. For example, in FIG. 2 and the associated description, a tag analysis module 244 may identify a non-conforming analytic tag based on comparisons between the tag and the rule database 248. It may further identify a non-conforming attribute of the non-conforming analytic element and identify a change that, if made to the non-conforming analytic element, will conform the analytic element to the violated rule. The tag analysis module 244 may pass this information to I/O module 242, which can communicate it to web server 220 where the change may be implemented directly to the source code of the non-conforming analytic element.

Turning now to FIG. 6, FIG. 6 illustrates that a method 600 for managing a configuration of network-based analytic elements includes an act 610 of accessing a URL. Act 610 comprises accessing, at a universal resource locator (URL), a web resource comprising one or more webpages associated with the web resource, wherein each of the one or more webpages is represented at least in part by webpage source code. For example, in FIG. 3 and the associated description, an analysis server 120a can be provided a URL. The URL can be provided through a site analyzer interface 310 or directly from an application.

Additionally, FIG. 6 illustrates that method 600 includes an act 620 of parsing a webpage. Act 620 comprises parsing the webpage source code associated with the one or more webpages. For example, in FIG. 3 and the associated description, an analysis module 340 parses webpage source code, in both rendered and unrendered form. Parsing the webpage source code comprises identifying components or the source code itself and identifying components within rendered version of the webpage source code. As such, the analysis module 340 can parse portions of the webpage source code that are viewable by the user and portions that are not typically viewable by the user.

FIG. 6 also illustrates that the method 600 includes an act 630 of identifying a dataset of information. Act 630 comprises identifying within the webpage source code a dataset of information. The dataset of information comprises a plurality of network-based analytic elements executable within a network-connected software application and one or more webpage source code attributes that comprise information relating to the rendering of the webpage source code. For example, in FIG. 2 and the associated description, a tag analysis module 244 of audit server 240 receives a dataset of information from the tag configuration database 232 over network 210. The dataset of information from the tag configuration database 232 includes a plurality of analytic elements and one or more webpage source code attributes. The webpage source code attributes comprise portions of the webpage, both rendered and unrendered. In some implementations, the I/O module 242 of audit server 242 receives the dataset.

In addition, FIG. 6 illustrates that the method 600 includes an act 640 of defining a first rule. Act 640 comprises based on the dataset of information, defining a first rule configured to associate at least one network-based analytic element selected from the plurality of network-based analytic elements with a webpage source code attribute selected from the one or more webpage source code attributes. For example, in FIG. 2 and the associated description, a rule creation module 246 defines rules for analytic elements where the defined rules are configured to describe at least one attribute of the corresponding analytic element(s). Further, rule creation module 246 defines said rules based on information received from tag analysis module 244, said information being derived from the dataset of information received from, for example, tag configuration database 232. An example rule may comprise the association of a particular network-based analytic element within a webpage source code attribute such as a particular word of phrase appearing within the rendered or unrendered webpage source code.

FIG. 6 also illustrates that the method 600 includes an act 650 of storing the first rule. Act 650 comprises storing the first rule within a digital database, the digital database comprising a set of rules configured to describe attributes of the plurality of network-based analytic elements. For example, in FIG. 2 and the associated description, a rule database 248 is configured to store the rules generated by the rule creation module 246. The rules may be stored, in some implementations, within rule database 248 by any means known in the art, including, for example, as regular expressions arranged in a table.

Further, FIG. 6 illustrates that the method 600 includes an act 660 of receiving new webpage source code. Act 600 comprises receiving new webpage source code associated with one or more new webpages. For example, in FIG. 4 and the associated description, an audit server 440 receives webpage source code from a web server 100. The audit server 440 analyzes new webpage source code as it is requested by the mobile application 420.

Further still, FIG. 6 illustrates that the method 600 includes an act 670 of identifying a non-conforming network-based analytic element. Act 670 comprises identifying a non-conforming network-based analytic element that does not conform to the first rule. For example, in FIG. 3 and the associated description, analysis module 340 identifies non-conforming network communications by communicating with the rule analysis module 350 and rules stored within rule database 248.

Accordingly, implementations of the present invention provide a system that can manage a configuration of analytic elements using a set of rules and one or more of an audit of the front-end of a web-connected software application, an audit of the back-end received analytic information, or combinations thereof. As such, implementations of the present invention provide significant technical improvements to the field of network communication management. For example, implementations of the present invention provide a system administrator with information relating to analytic elements that would not otherwise be available.

Additionally, implementations of the present invention increase the reliability and consistency of analytics information by ensuring that each analytic element is properly logged. One of skill in the art will understand that incorrectly-logged analytic elements may lead to lost data, incorrect data, and other such problems within the resulting analytics. One of skill in the art will also understand that analytic elements that include out-of-date attributes may similarly provide, lost data, incorrect data, and other such problems with resulting analytics.

Although the subject matter has been described in language specific to structural features, modules, and/or methodological acts, it is to be understood that the subject matter defined in the appended claims is not necessarily limited to the described features, modules, or acts described above, or the order of the acts described above. Rather, the described features, modules, and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NTC"), and then eventually transferred to computer system RANI and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer system for managing a configuration of network-based analytic elements, comprising:

one or more processors; and
one or more storage devices having stored thereon computer-executable instructions that when executed by the one or more processors cause the computer system to perform at least the following:
  access, at a universal resource locator (URL), a web resource comprising one or more webpages associated with the web resource, wherein each of the one or more webpages is represented at least in part by webpage source code;
  parse the webpage source code associated with the one or more webpages;
  identify within the webpage source code a dataset of information, wherein the dataset of information comprises:
    a plurality of network-based analytic elements executable within a network-connected software application, and
    one or more webpage source code attributes that comprise information relating to a rendering of the webpage source code;
  based on the dataset of information, define a first rule configured to associate at least one network-based analytic element selected from the plurality of network-based analytic elements with a webpage source code attribute selected from the one or more webpage source code attributes;
  store the first rule within a digital database, the digital database comprising a set of rules configured to describe attributes of the plurality of network-based analytic elements;
  receive new webpage source code associated with one or more new webpages; and
  identify a non-conforming network-based analytic element that does not conform to the first rule.

2. The computer system as recited in claim 1, wherein accessing the web resource occurs within a virtual machine.

3. The computer system as recited in claim 1, further comprising computer-executable instructions that configure the computer system to perform at least the following:
  access, with the one or more processors, the non-conforming network-based analytic element; and
  identify a non-conforming attribute of the non-conforming network-based analytic element.

4. The computer system as recited in claim 3, further comprising computer-executable instructions that configure the computer system to perform at least the following:
  define an updated first rule, wherein the updated first rule is configured to describe the non-conforming attribute; and
  store the updated first rule within the digital database.

5. The computer system as recited in claim 4, wherein the computer system is configured to perform one or more of changing the non-conforming attribute, defining the updated first rule, storing the updated first rule, or combinations thereof, in response to a user input.

6. The computer system as recited in claim 4, further comprising computer-executable instructions that configure the computer system to generate a report indicating the updated first rule.

7. The computer system as recited in claim 1, wherein the dataset of information also comprises information received by a network-based destination of the plurality of network-based analytic elements based on execution of the plurality of network-based analytic elements within the network-connected software application.

8. The computer system as recited in claim 7, further comprising computer-executable instructions that configure the computer system to perform at least the following:
  access, with the one or more processors, source code associated with the non-conforming network-based analytic element, wherein the source code is executable within the network-connected software application; and
  change the source code of the non-conforming network-based analytic element so that the non-conforming network-based analytic element conforms with the first rule.

9. The computer system as recited in claim 1, wherein parsing the webpage source code associated with the one or more webpages comprises:
  parsing content displayed by the webpage source code within the network-connected software application.

10. The computer system as recited in claim 9, further comprising computer-executable instructions that configure the computer system to perform at least the following:
  rendering the webpage source code to create a rendered webpage; and
  parsing the webpage source code associated with the one or more webpages comprises parsing digital content with the rendered webpage, wherein at least a portion of the digital content is not viewable within unrendered source code.

11. The computer system as recited in claim 10, wherein the webpage source code is rendered within a virtual machine.

12. The computer system as recited in claim 9, wherein defining the first rule configured to associate the at least one network-based analytic element selected from the plurality of network-based analytic elements with the webpage source code attribute selected from the one or more webpage source code attributes comprises:
  identifying within the rendered webpage the webpage source code attribute, wherein the webpage source code attribute comprises rendered information that is viewable by a user; and
  associating the at least one network-based analytic element with the webpage source code attribute.

13. The computer system as recited in claim 1, wherein at least a portion of the network-based analytic elements of the plurality of network-based analytic elements are associated with a network communication initiated by a client based upon content that is delivered to the client.

14. The computer system as recited in claim 13, wherein the network-connected software application comprises a web browser.

15. A computer-implemented method for managing a configuration of network-based analytic elements, the computer-implemented method comprising:
  access, at a universal resource locator (URL), a website comprising one or more webpages associated with the website, wherein each of the one or more webpages is represented at least in part by webpage source code;
  parse the webpage source code associated with the one or more webpages;
  identify within the webpage source code a dataset of information, wherein the dataset of information comprises:
    a plurality of network-based analytic elements executable within a network-connected software application, and one or more webpage source code attributes that comprise information relating to a rendering of the webpage source code;

based on the dataset of information, define a first rule configured to associate at least one network-based analytic element selected from the plurality of network-based analytic elements with a webpage source code attribute selected from the one or more webpage source code attributes;

store the first rule within a digital database, the digital database comprising a set of rules configured to describe attributes of the plurality of network-based analytic elements;

receive new webpage source code associated with one or more new webpages; and identify a non-conforming network-based analytic element that does not conform to the first rule.

16. The computer-implemented method as recited in claim 15, further comprising:

parsing content displayed by the webpage source code within the network-connected software application.

17. The computer-implemented method as recited in claim 16, further comprising:

rendering the webpage source code to create a rendered webpage; and parsing the webpage source code associated with the one or more webpages comprises parsing digital content with the rendered webpage, wherein at least a portion of the digital content is not viewable within unrendered source code.

18. The computer-implemented method as recited in claim 17, wherein the webpage source code is rendered within a virtual machine.

19. The computer-implemented method as recited in claim 17, wherein defining the first rule configured to associate the at least one network-based analytic element selected from the plurality of network-based analytic elements with the webpage source code attribute selected from the one or more webpage source code attributes comprises:

identifying within the rendered webpage the webpage source code attribute, wherein the webpage source code attribute comprises rendered information that is viewable by a user; and associating the at least one network-based analytic element with the webpage source code attribute.

20. A computer program product comprising one or more hardware storage devices having stored thereon computer-executable instructions that are executable by one or more processors of a computer system and that, when executed by the one or more processors, cause the computer system to manage a configuration of network-based analytic elements, including computer-executable instructions that configure the computer system to perform at least the following:

access, at a universal resource locator (URL), a website comprising one or more webpages associated with the website, wherein each of the one or more webpages is represented at least in part by webpage source code;

parse the webpage source code associated with the one or more webpages;

identify within the webpage source code a dataset of information, wherein the dataset of information comprises:

a plurality of network-based analytic elements executable within a network-connected software application, and one or more webpage source code attributes that comprise information relating to a rendering of the webpage source code;

based on the dataset of information, define a first rule configured to associate at least one network-based analytic element selected from the plurality of network-based analytic elements with a webpage source code attribute selected from the one or more webpage source code attributes;

store the first rule within a digital database, the digital database comprising a set of rules configured to describe attributes of the plurality of network-based analytic elements;

receive new webpage source code associated with one or more new webpages; and identify a non-conforming network-based analytic element that does not conform to the first rule.

* * * * *